J. M. CAGE.
INTERNAL COMBUSTION ENGINE.
APPLICATION FILED JUNE 7, 1917. RENEWED MAY 26, 1921.

1,386,393.

Patented Aug. 2, 1921.

Witness
Chas. W. Stauffer
Karl N. Butler

Inventor
John M. Cage,
By
Attorneys

J. M. CAGE.
INTERNAL COMBUSTION ENGINE.
APPLICATION FILED JUNE 7, 1917. RENEWED MAY 26, 1921.

1,386,393.

Patented Aug. 2, 1921.
7 SHEETS—SHEET 5.

UNITED STATES PATENT OFFICE.

JOHN M. CAGE, OF LONG BEACH, CALIFORNIA, ASSIGNOR TO CAGE ENGINE SYNDICATE INC., A CORPORATION OF DELAWARE.

INTERNAL-COMBUSTION ENGINE.

1,386,393. Specification of Letters Patent. Patented Aug. 2, 1921.

Application filed June 7, 1917, Serial No. 173,409. Renewed May 26, 1921. Serial No. 472,883.

*To all whom it may concern:*

Be it known that I, JOHN M. CAGE, a citizen of the United States of America, residing at Long Beach, in the county of Los Angeles and State of California, have invented certain new and useful Improvements in Internal-Combustion Engines, of which the following is a specification, reference being had therein to the accompanying drawings.

This invention relates to internal combustion engines, and has special reference to a two-cycle, four-cylinder engine that possesses all the essential prerequisites of a four cycle engine and is characterized in the following particulars.

First, there are ported reciprocable work cylinders surrounded by ported reciprocable valve sleeves, the latter controlling the admission and exhaust of fluids and liquids to and from the work cylinders in which are reciprocable compound pistons. These compound pistons perform a four cycle function in a two cycle engine, that is, there is an explosion for each revolution of the crank shaft of the engine.

Second, there is a novel cylinder case having ports, chambers, conduits and intake and exhaust manifolds, together with a jacket, that permits of air, fuel, oil and a cooling agent being conducted in and about the valve sleeves of the engine so that the air and fuel may be utilized for explosion purposes; the oil as a lubricant for the reciprocable working cylinders, valve sleeves and compound pistons; and, the water or air as a cooling agent so that the thermal energy of the engine will be retained.

Third, my invention is characterized by inducing air to enter a cylinder casing, forcing the air by one of the piston heads of the compound piston out of the casing and utilizing the air which is under pressure as a scavening agent for forcing residual gases from the work cylinders. The fuel is treated in somewhat the same manner, that is, it is drawn into a work cylinder, forced therefrom into storage chamber and intake passages, momentarily held under compression, and eventually admitted again to the work cylinders to be exploded. The vaporized gasolene or other fuel is heated by the exhaust manifold of the engine and by utilizing one of the piston heads of the compound piston for forcing the fuel into intake passages, there is always a partially compressed supply of fuel ready to enter a work cylinder so that it may be immediately ignited.

Fourth, there is a novel operating mechanism for the work cylinders and valve sleeves of the engine so that these work cylinders and valve sleeves may be reciprocated in synchronism and in such timed relation to each other, and cylinder to cylinder so that a maximum horse power is obtainable from a minimum expenditure of fuel. Besides the novel operating mechanism which has been made the subject matter of a companion application, filed under even date, S. N. 173,408, there are certain structural features all of which coöperate in providing an engine high in horse power and light in weight, such features contributing to an engine that may be advantageously used as the power plant of an air plane.

Further, there are certain novel features of piston and cylinder and valve mechanisms combination; and combustion chamber and charge compressing chamber combination; which are hereinafter set out in detail and made the subject matter of some of the claims herewith. And in this connection, and broadly with relation to the cyclic operation of the various parts, and certain other details which are explained in said former application, this present application is in part a continuation of my former application S. N. 113,105 filed August 4, 1916, for internal combustion engines.

So far sufficient mechanical features of my invention have been set forth to briefly consider two other features which lead to the high efficiency of the engine, and as a foreword I may mention, that results are attained, which have been the aim of all explosive engine builders or engineers and never attained with the degree of success as evident from the engine now in operation. The features may be considered as "positive stratification of fuel and air in a chamber" and "packing of the fuel or an explosive mixture at its firing position."

To accomplish the much desired stratification of fuel and air, there must be a predetermined cycle of operation of the work cylinders and valve sleeves previously mentioned, in connection with a chamber of maximum compression capacity, so that the air, which I use as a scavenging agent, will be trapped in the chamber or cylinder to form a cushioning agent, capable of great expansion, for the fuel when fired. Briefly this is attained by closing the air and gas exhaust ports of the chamber or cylinder on the bottom dead center of the crank shaft of the engine; pistons in extreme lower positions, thus insuring maximum area for the air, which is confined in the lower end of each cylinder. The air thus trapped is disassociated relative to the fuel, not only by its own volition or chemical constituents, but by a mechanical detail to be hereinafter considered. However, it is the same mechanical detail which contributes to the packing of fuel at its firing point—the spark plug—which permits of all the heat of the fuel being concentrated for action upon the trapped cushioning agent (air) to attack the same from a vertical point, thus insuring a rate of flame propagation that utilizes a maximum heat energy of the fuel for instantaneous expansion of the trapped air, with a resultant high power or pressure on the piston, before diminution of temperature or pressure has taken place.

These matters I here explain in order that the mechanism of my invention may be fully described and its advantages understood; but the features of "stratification" and "packing of charge" themselves are made the subject matter of and claimed in a copending application entitled Internal combustion engine and method of operation, filed Sept. 3, 1918, S. N. 252,356.

The foregoing features will be further considered and understood, particularly by those conversant with engine construction, by reference to the drawings and the detail description thereof, so first referring to the drawings.

Figures 1, 11:
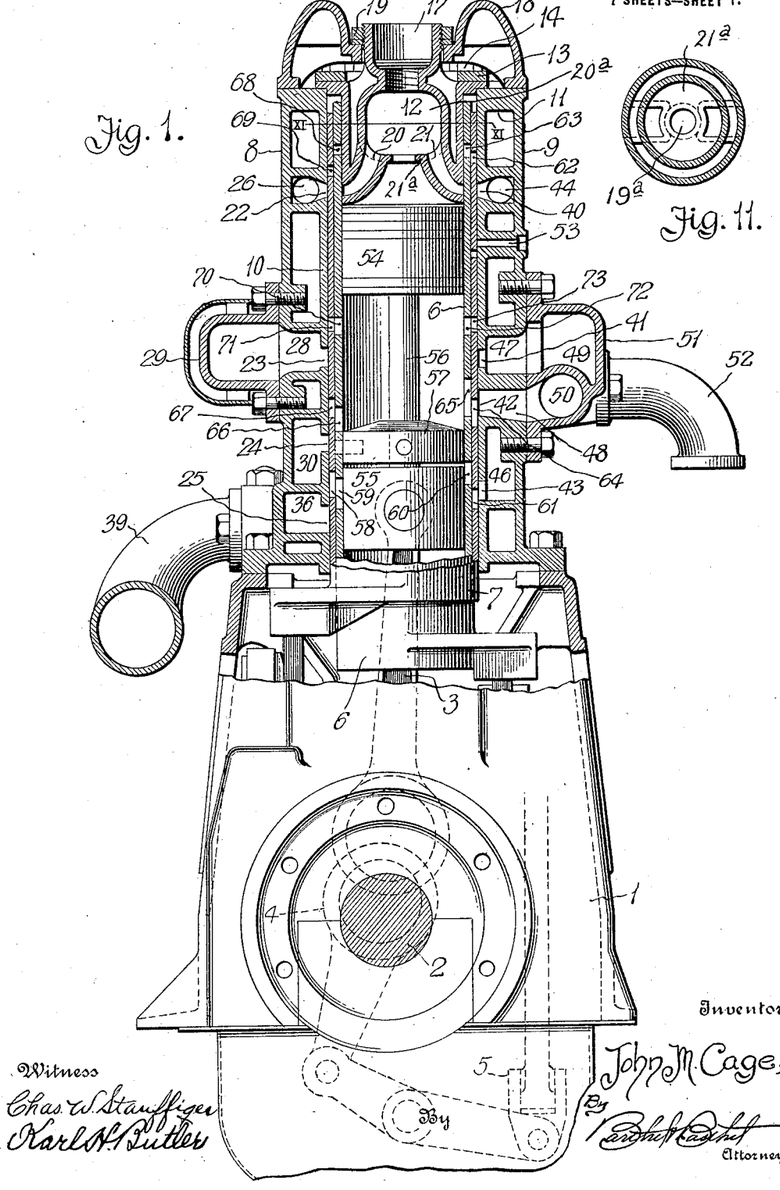
Figure 1 is a vertical sectional view of the engine, showing the crank case partly in end view.
Fig. 11 is a horizontal section on line IX—IX of Fig. 1.

Reference will first be had to Fig. 1 of the drawing, as this view shows an assembly including the crank case 1 and a cylinder casing on the crank case. Longitudinally of the crank case 1 is a driven crank shaft 2 having crank portions or connecting rods 3 and one or more eccentrics 4 adapted for imparting movement to an operating mechanism, generally designated 5, by which work cylinders 6 and valve sleeves 7 are reciprocated in synchronism or timed relation within the cylinder casing of the engine. As heretofore pointed out, the operating mechanism 5 has been made the subject matter of a companion application, filed under even date, and now it is only necessary to state that the engine includes four units, generally designated, A, B, C and D, all of which coöperate in timed relation, so that the crank shaft 2 is evenly driven by compound pistons of said units. The work cylinders 6 and the valve sleeves 7 of each unit are articulated relative to the operating mechanism 5 so that these two elements may be reciprocated while a compound piston is reciprocated within the work cylinders 6, and for the sake of clearness in describing my invention, I prefer to refer first to one side of the cylinder casing and then to the opposite side thereof, that side of the casing shown in Fig. 2 being conveniently considered as the "left hand" side and that side shown in Fig. 3 as the "right hand" side. To consider these sides of the cylinder casing, it is necessary to refer to all of the units, but when considering the relation of the ports of the work cylinder and valve sleeve relative to the ports, conduits, and passages of the cylinder casing, particularly the shifting of the former relative to the latter, it is only necessary to consider a single unit, which will be hereinafter done in connection with Fig. 1 of the drawing. The cylinder casing is a casting having side walls 8 and 9 and between said side walls are outer cylinders 10 for the units of the engine. At the upper end of each outer cylinder 10 there is a web portion 11 connecting the cylinder to the walls 8 and 9 and extending into each cylinder in spaced relation thereto, is a head 12 retained in place by a member 13 held in engagement with the cylinder casing by screw bolts 14 entering openings 15 provided therefor in the web portion 11 connecting the walls 8 and 9 of the cylinder casing. The head 12 has a spark plug holder 17 and fitted over the spark plug holders of all of the heads is a hollow cap 18 closing the upper end of the cylinder casing, and retained thereon by nuts 19 or similar fastening means on the holders 17. The hollow cap 18 is in communication with the space between the walls 8 and 9 and the outer cylinders 10 and forms part of a jacket for the heads 12 and the outer cylinders 10.

The valve sleeves 7 reciprocate within the outer cylinders and the work cylinders 6 reciprocate between the valve sleeves 7 and the heads 12. Each head has a gas inlet port 20 and an air inlet port 21, these ports being in opposed relation and curved upwardly to admit gas and air to a dome shaped firing chamber 20ª in each head. As best shown in Figs. 1 and 11, the ports 20 and 21 and the walls of the head are connected by a horizontal wall 21ª having an axial opening 19ª. The wall 21ª provides the firing chamber 20ª which may be quickly cleared by air for the trapping of gas in proximity to the fuel ignition device of the engine.

Figure 2:
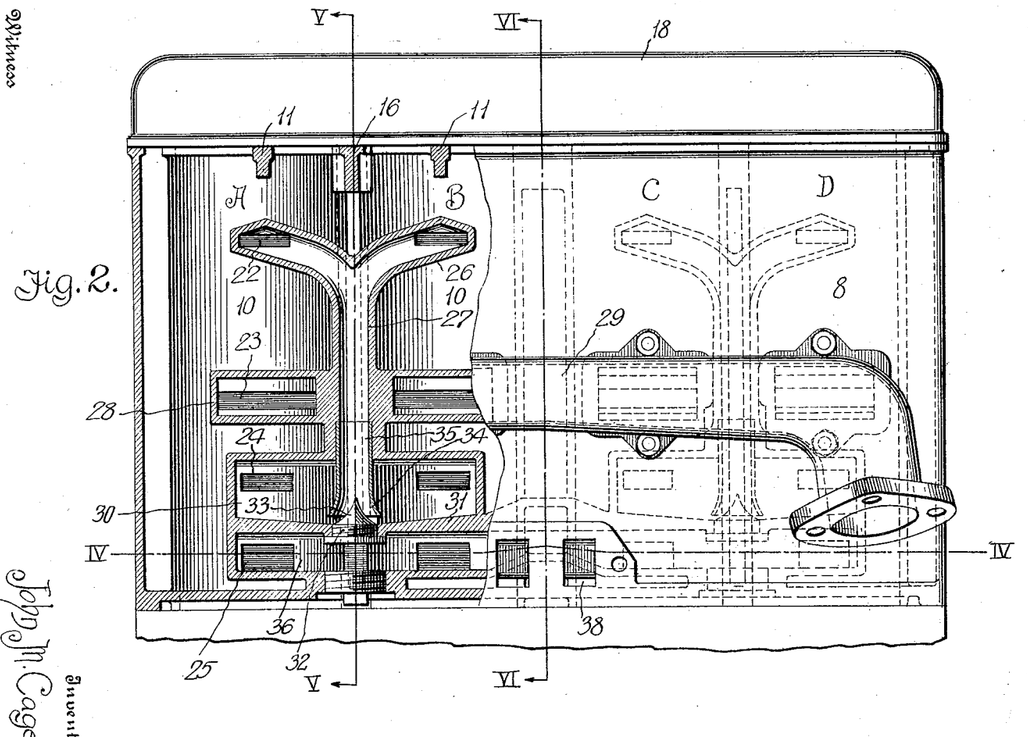
Fig. 2 is a view of one side of the cylinder casing, partly broken away and partly in section, showing one of the exhaust manifolds.

Considering the left hand side of the cylinder casing, each outer cylinder 10 has a gas intake port 22, a lateral or wide exhaust port 23, a gas outlet port 24 and an air inlet port 25, said ports being in the order named from the top of the outer cylinder to the bottom thereof.

The gas intake port 22 of the cylinder units A and B are in communication with branch passages 26 of a conduit or storage chamber 27 extending downwardly between chambers 28 with which the exhaust ports 23 communicate. The branches of the conduits 27 are integral with the casing wall 8 and the walls of the cylinders 10, but the walls of the conduits are spaced from the cylinder walls so a cooling agent may circulate therebetween. This is also true of the exhaust chambers 28, with the exception that said chambers are open at the casing wall 8 to communicate with an exhaust manifold 29 suitably connected to the wall 8. This exhaust manifold also serves the exhaust chambers 28 of the cylinder units C and D, as clearly shown in Fig. 2. By having a gas conduit serving two units there is always an explosive charge ready for either unit.

The gas outlet ports 24 of the cylinder units A and B communicate with a gas chamber 30 having a bottom wall 31 inclined toward the center, where there is an opening normally closed by a plug 32 having a conical inner end 33. Above the inner end of the plug 32 is a flared mouth 34 of a tube 35 fitted in the lower end of the conduit 27, and gas admitted to the chamber 30 through the ports 24 must pass into the flared mouth 34 of the tube 35 to enter the conduit 27 and the branches thereof. Any condensate from vaporized gasolene or other fuel will drain toward the plug 32 and be lifted into the tube 35 and the conduit 27 by the suction produced by pressure within the conduits.

Figure 4:
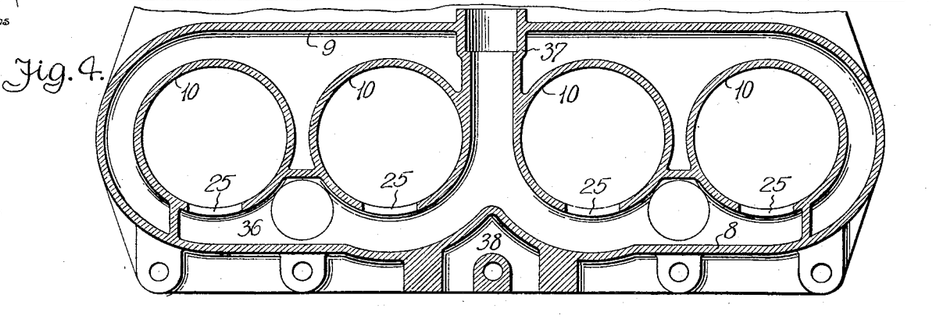
Fig. 4 is a horizontal sectional view taken on the line IV—IV of Fig. 2.

The air ports 25 communicate with an air chamber 36, said chamber having for a portion of its top wall the bottom walls 31 of the chambers 30 of all of the cylinder units, and the air chamber 36 is best shown in Fig. 4 where it will be noted that said chamber has an inlet conduit 37 formed between the cylinder units B and C and extending to the wall 9 of the cylinder casing.

The walls of the chambers 30 and 36 are integral with the wall 8 and the walls of the cylinders 10, and the inset portion of the air chamber 36 provides clearance for ports 38 in the wall 8 communicating with the space that surrounds the cylinders 10 and all of the chambers and conduits, this space constituting a jacket for a cooling agent, as water or air which may be admitted to the ports 38 through a connection 39.

Figure 3:
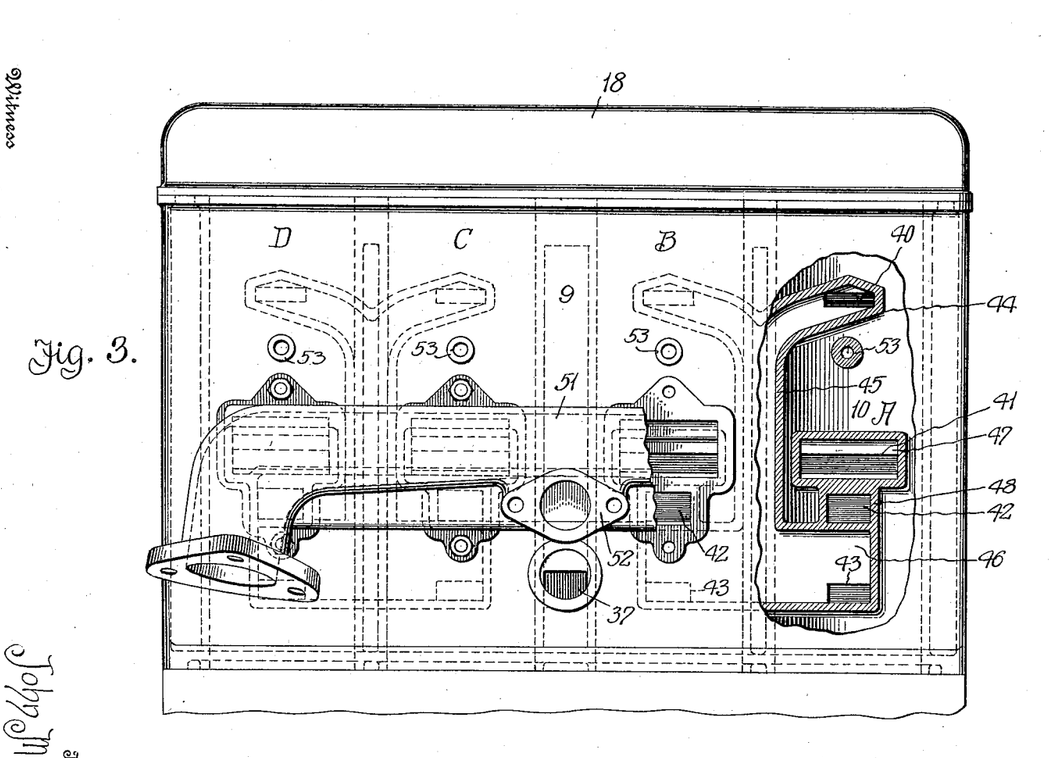
Fig. 3 is a view of the opposite side of the engine, partly broken away and partly in section.

Considering the right hand side of the engine, as best shown in Fig. 3, each of the cylinders 10 has an air intake port 40, an exhaust port 41, a gas intake port 42, and an air outlet port 43, these ports being in the order named from the top of the cylinders to the lower ends thereof. The air intake ports 40 communicate with branches 44 of an air conduit 45, there being two such conduits, each serving two cylinders. The conduits 45 communicate with air chambers 46 into which the ports 43 open. The arrangement of the air conduits 45 relative to the units of the engine possesses the same advantage as mentioned in connection with the gas conduits.

The ports 41 and 42 communicate with chambers 47 and 48 respectively, and these chambers and chambers 46 have walls thereof integral with the wall 9 and the walls of the cylinders 10. The chambers 47 and 48 communicate with passages 49 and 50 respectively, in a combined intake and exhaust manifold 51, suitably connected to the wall 9 of the cylinder casing. The passage 49 of the manifold has an outlet at one end of said manifold, and the passage 50 which communicates with the chambers 48 and the gas intake ports 42, has a central connection 52 for a carbureter or other fuel vaporizing device. By reference to Fig. 1, it will be noted that the bottom wall of the exhaust passage 49 forms the top wall of the gas intake passage 50, consequently the wall dividing these passages will be heated and tend to further vaporize or place the fuel in better condition for the explosion.

Between the ports 40 and 41, the cylinders 10 are ported to communicate with oil passages 53 that may be placed in communication with a suitable lubricant supply.

So far I have described the conduits, passages and chambers between the cylinder walls and the walls of the cylinder casing and it will be noted that the entire structure can be readily cast *en bloc*.

Reciprocable in each work cylinder 6 is a compound piston composed of pistons 54 and 55 connected by a rod 56 which is slidable in a partition 57 fixed in the work cylinder 6. The piston heads 54 and 55 have suitable packing or packing rings and the piston head 55 is connected in the usual manner to the connecting rod 3, so that the upper and lower piston heads will be reciprocated in synchronism to and from the stationary partition 57. The partition 57 is simply stationary relative to the work cylinder and the work cylinder and valve sleeve can be reciprocated during the operation of the compound piston within the work cylinder.

Considering the ports of the valve sleeves 7 and work cylinders 6 said sleeves and cylinders have ports 58 and 59 respectively, adapted to register and communicate with the ports 25, so that air from the chamber 36 may be admitted to each work cylinder between the piston head 55 and the partition 57. The air may be forced from the work cylinders through ports 60 and 61 of the work cylinders and valve sleeves respectively when the ports 60 and 61 register and communicate with the air outlet ports 43 which open into the chambers 46. The air may pass through said chambers upwardly through the conduits 45 and the branches 44 thereof to the ports 40 and these ports are adapted for communication with ports 62 and 63 of the sleeves 7 and cylinders 6, when said ports register, so that air may be ejected from the head ports 21 into the upper ends of the work cylinders 6.

The sleeves 7 and the cylinders 6, above the partitions 57 are provided with ports 64 and 65 respectively, adapted to register and communicate with the gas intake ports 42 of the cylinders 10, so that the gas may be admitted to said cylinders, between the partitions 57 and the piston heads 54, from the passage 50 of the combined intake and exhaust manifold 51. The gas admitted to the work cylinders between the partitions 57 and the piston heads 54 is adapted to be forced therefrom and placed under compression in the chambers 30 and the conduits 27. To accomplish this the work cylinders 6 and the valve sleeves 7 have ports 66 and 67 respectively adapted to register and communicate with the ports 24 opening into the chambers 30. The gas placed under compression in the chambers 30 and the conduits 27 may be admitted to the upper ends of the work cylinders 6 through the medium of ports 68 and 69 in the cylinders 6 and the sleeves 7 respectively. The ports 68 and 69 are adapted to register and establish communication between the ports 22 and the ports 20.

Intermediate the ends of the work cylinders 6 and the valve sleeves 7 are exhaust ports 70 and 71 adapted to register and communicate with the ports 23, and other ports 72 and 73 of the work cylinders and valve sleeves are adapted to register and communicate with exhaust ports 41. With the piston heads 54 below the ports 70 and 72 of the work cylinders, it is possible for the upper ends of these cylinders to exhaust into the exhaust manifolds at both sides of the engine.

The valve sleeves 7 have other ports 74 adapted to register with the oil passages 53 so that a lubricant may insure a non-frictional movement of the work cylinders and valve sleeves in the cylinders 10.

Figure 7:
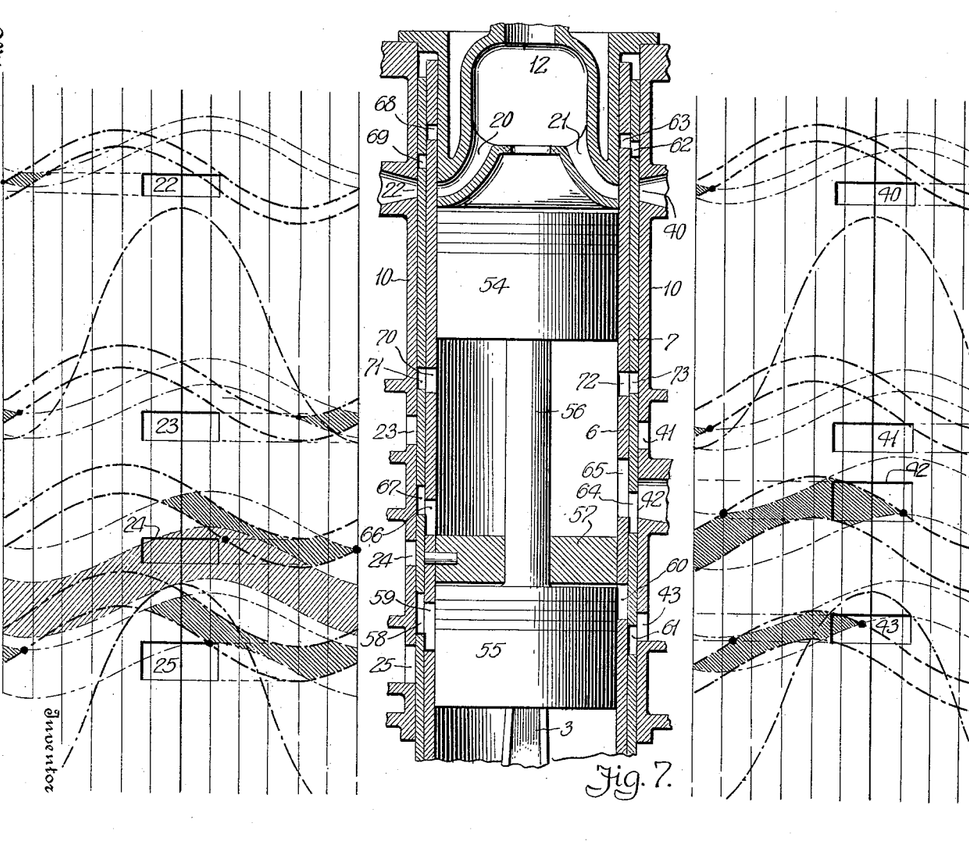
Fig. 7 is a vertical sectional view of a portion of the cylinder casing showing in diagram the coöperative relation of ports and passages for the single units of the engine.

Reference will now be had to Fig. 7 showing one of the units of the engine and the left and right hand sides of the work cylinders and valve sleeves developed. The ports 22 to 25 inclusive and 40 to 43 inclusive, have been shown in full lines and the reciprocable movement of the various ports of the work cylinders and valve sleeves have been shown by broken lines. Besides this, the stationary partition 57 has been indicated, and the travel of the piston heads 54 and 55 relative to the ports. The development has been made relative to a single revolution of the engine crank shaft 2, the revolution being indicated by vertical lines with the spaces between the lines representing thirty degrees of a single revolution. These developed views clearly bring out, by shaded portions and dotted indicia, the timed registration of the ports of the work cylinders and valve sleeves during one revolution of the crank shaft, and it is to be noted that there is a maximum area of registration in connection with all of the ports. From these developed views may also be gathered the proportionate time the various ports are opened during one revolution of the crank shaft. For instance, the ports 25, 58 and 59 will communicate for approximately one hundred and seventy degrees of a revolution, the opening and closing being somewhat of a shutter action with the maximum opening during sixty degrees of a revolution. The maximum opening of the ports 43, 61 and 60 is about one hundred and thirty degrees of a revolution so that the lower end of the work cylinder can obtain a full charge of air, at high velocity, and due to the long period of communication between the ports 25, 28 and 59, all the air in the lower end of the work cylinder can enter the air chambers and conduits at the same velocity. The same is true in connection with the gas ports 42, 64, 65, which are open for approximately two hundred degrees for a full charge and ports 66 and 67 for approximately one hundred and thirty degrees, but when it comes to the remaining ports of the work cylinder and valve sleeve, the communication between said ports is materially cut down, being approximately fifty to sixty degrees of a revolution. A long period of communication between the ports is not essential owing to the fact that the gas, under compression, in its chamber and conduit can quickly enter the upper end of the work cylinder. The timing of these ports, however, is set so that an initial charge of air will enter the upper end of the work cylinder and expel residual or spent gases when the exhaust ports are open, and this is quickly accomplished by reason of two sets of exhaust ports being used.

Figures 5, 10:
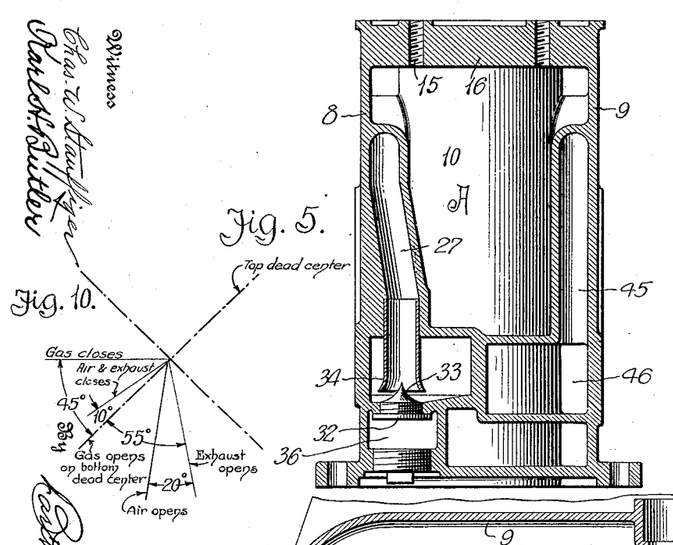
Fig. 5 is a vertical cross sectional view taken on the line V—V of Fig. 2.
Fig. 10 is a diagrammatic view of a cycle of operation of a portion of the engine.
Figure 6:
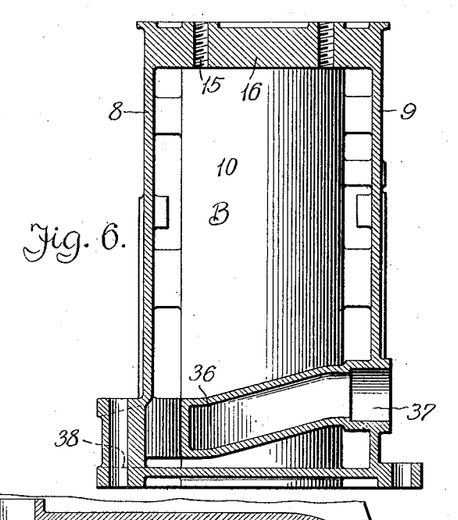
Fig. 6 is a similar view taken on the line VI—VI of Fig. 2.

By reference to Fig. 10 of the drawing, a cyclic operation of the gas and air intake ports relative to the exhaust ports is shown, relative to top and bottom dead centers, by which I mean the extreme upper and lower positions of a piston. Assuming that the exhaust ports are open, such opening is followed in twenty degrees of the cycle by air being admitted to the chamber 20$^a$ and this chamber is cleansed of all residual gases that may remain therein, the gases being driven through the opening 19$^a$ downwardly through the work cylinder and out of the exhaust port. The air traveling at a high velocity quickly scavenges the work cylinder and leaves a volume of air within the work cylinder. The opening of the air port is followed by the opening of the gas port, and this takes place at the bottom dead center or lowermost position of the piston, so that there is a maximum chamber area for air and gas. This is very important, as I obtain a maximum volume of air in the lower end of the work cylinder, and in ten degrees more cycle, the air and exhaust ports are closed while the gas intake port does not close until fortyfive degrees more of the cycle. In consequence of this timed opening and closing of the ports, the air within the lower end of the work cylinder is confined below the horizontal wall 21$^a$ and the gas is confined within the explosive chamber 20$^a$, such confinement of air and gas producing strata within the work cylinder. Thus with the gas under pressure, a portion of the same on entering the chamber 20$^a$ may pass through the opening 19$^a$ and be cushioned by the air trapped within the bottom of the work cylinder. Since the gas has been thoroughly commingled with air prior to being placed under compression within the conduits or storage chambers 27, there is not necessarily a commingling of gas and air within the work cylinder, consequently the strata are maintained within the work cylinder which is a desideratum, in all explosive engines. With both the gas and air under compression and the latter serving as a cushion for the former ignition takes place with all of the ports closed, the explosive mixture having been confined about the spark plug, it is exploded. The strong combustible mixture ignites with a certainty and the flame passes through the opening 19$^a$ with great rapidity. During the advance of the piston it effects the combustion of further layers of the gaseous mixture, while the shock is deadened by the cushion of air or inert gases interposed between the combustible charge and the piston. While the inert gas may be air alone which is capable of combustion, yet there may be traces of products of combustion which are incapable of affording combustion, or there may be a mixture of both. By having the packed air or cushion within the working cylinder, it not only relieves the piston of shock explosion, but absorbs heat which would otherwise be lost by conduction. Insomuch that the flame propagation is slow after passing through the opening 19$^a$, there is a minimum heat and a maximum pressure, both of which contribute to the efficiency of the engine.

With a single explosion taking place in each cylinder during each revolution of the crank shaft, it is obvious that when all of the units of the engine are timed so that there will be an explosion for each quarter of a revolution of the crank shaft, said shaft will be uniformly driven.

Figure 8:
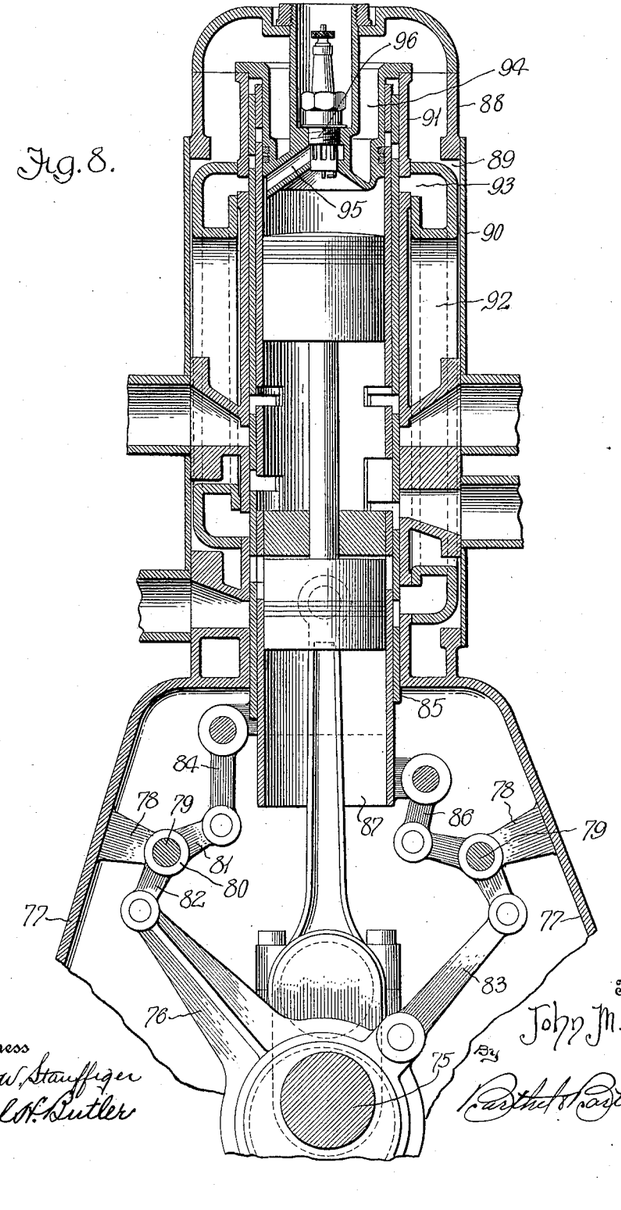
Fig. 8 is a vertical cross sectional view of an engine illustrating a slight modification of the same.
Figure 9:
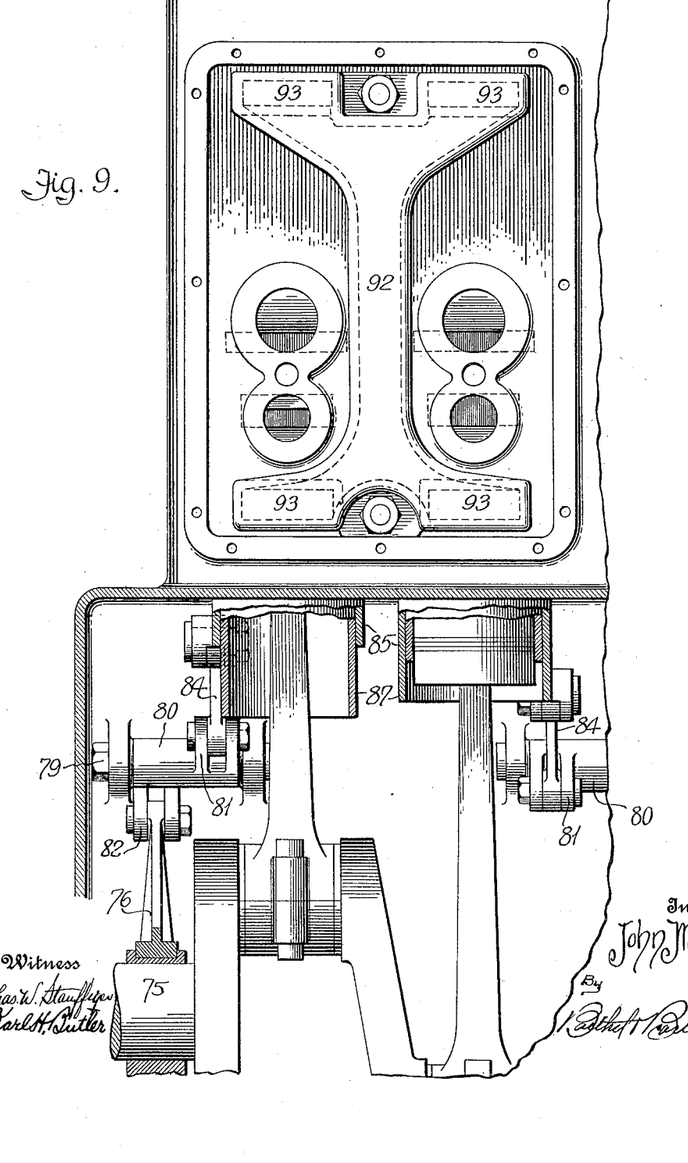
Fig. 9 is a longitudinal sectional view of a portion of the modified engine, partly in elevation.

Reference will now be had to Figs. 8 and 9 of the drawings, showing modified forms of construction, the first modification being in connection with the operating mechanism for the work cylinders, and valve sleeves of the engine. The reference numeral 75 denotes a crank shaft of the modified form of engine, and on said crank is an eccentric 76 for the valve sleeve and work cylinder of each unit of the engine. Extending inwardly from walls 77 of the crank case are brackets 78 connected by shafts 79 and on said shafts are rock sleeves 80 provided with sets of apertured ears 81 and 82. The set of apertured ears 82 at one side of the crank case is connected direct to the eccentric 76 and at the other side of the crank case there is a link connection 83 between the eccentric 76 and the set of apertured ears 82. The apertured ears 81 at one side of the crank case are connected by a link 84 to a valve sleeve 85, and the apertured ears 81 at the other side of the crank case are connected by a link 86 to a work cylinder 87. The work cylinder 87 and the valve sleeve 85 are practically the same from a structural standpoint as the work cylinders and valve sleeves previously described.

The crank case of the engine is integral with a cylinder casing 88 having the side walls thereof provided with large openings 89 normally closed by detachable side plates 90. These detachable side plates permit of easy access being had to the inner cylinders 91 and instead of making the air and gas chambers and conduits integral with the cylinder casing and the outer cylinders, I provide detachable conduits 92 having the ends thereof formed with chambers 93 in communication with ports of the outer cylinders 91. The detachable conduits 92 are shaped to provide clearance for intake and exhaust ports of the outer cylinders, and another change resides in the heads 94 for the outer cylinders. These heads have angularly disposed passages 95, communicating with spark plugs 96 in the heads 94, so that gas admitted to the upper ends of the work cylinders will enter the spark plugs, remove carbon and other matter that may tend to interfere with the sparking at the electrodes of the plugs, and be at the proper place for instant firing.

Again referring to the preferred form of construction, it will be noted that each cylinder provides a combustion chamber having two intake ports and two exhaust ports; that the space between the partition 57 and the upper piston head 54 provides a gas compression chamber having an intake port and an outlet port and when the intake port is closed, the piston head 54 may compress gas in the conduit 27, which serves as a storage chamber. The space between the partition 57 and the lower piston head 55 constitutes an air chamber having an intake port and an outlet port and that when the intake port is open the lower piston head may force air in the conduit 45 and thus increase the velocity of the air entering a work cylinder.

What I claim is:—

1. In an engine, the combination of a reciprocable work cylinder and valve sleeve, a head in said work cylinder providing a combustion chamber, a partition fixed in said work cylinder, a reciprocable compound piston in said work cylinder coöperating with the partition in providing gas compression and air chambers, and conduits adapted to receive air and gas from said gas compression and air chambers and deliver the air and gas to said combustion chamber, said work cylinder and valve sleeve being ported and adapted to control the admission, compression and exhaust of air and gas to and from all of said chambers.

2. In an engine, a ported work cylinder, a head therein providing a combustion chamber, a partition fixed to the wall of said cylinder and providing therein gas compression and air chambers next to and on opposite sides of said partition, gas storage and air chambers adapted to communicate with the combustion chamber and with said gas compression and air chambers to receive gas and air therefrom, pistons in the gas compression and air chambers of said cylinder adapted to force gas and air into said gas storage and air chambers, and a single reciprocable means controlling admission of air and gas to all of said combustion, gas, compression and air chambers, said means being separate from the pistons and articulated to coöperate therewith.

3. In an engine, the combination of a combustion chamber having two intake ports and an outlet port, an air chamber having intake and outlet ports and adapted to communicate with the atmosphere, a gas chamber having intake and outlet ports and adapted to communicate with a supply of gas, a conduit connecting the outlet port of the air chamber with one of the intake ports of the combustion chamber, a storage chamber connecting the outlet port of the gas chamber with the other intake port of the combustion chamber, compound pistons operatable in said air and gas chambers adapted to force air through said conduit and compress gas in said chamber, and a single reciprocable valve means comprising a sleeve controlling the admission and outlet of air and gas to and from all of said chambers, said means being separated from the pistons and coöperating therewith.

4. In an engine, the combination of a combustion chamber having two intake ports and an outlet port, an air chamber having intake and outlet ports, and adapted to communicate with the atmosphere, a gas chamber having intake and outlet ports and adapted to communicate with a supply of gas, a conduit connecting the outlet port of the air chamber with one of the intake ports of the combustion chamber, a storage chamber connecting the outlet port of the gas chamber with the other intake port of the combustion chamber, the storage chamber having an inclined bottom so that condensate may be drawn through said chamber by suction therein, a compound piston operatable in said air and gas and combustion chambers adapted to force air in said conduit and compress gas in said chamber, and reciprocable means operatable in timed relation to said compound piston adapted to control the admission and outlet of air to and from all of said chambers.

5. In an engine, the combination of a work cylinder having a combustion chamber provided with two intake ports and an outlet port, said work cylinder having an air chamber provided with intake and outlet ports and adapted to communicate with the atmosphere, said work cylinder having a gas chamber provided with intake and outlet ports and adapted to communicate with a supply of gas, a conduit adapted to connect the outlet port of the air chamber with one of the intake ports of the combustion chamber, a storage chamber adapted to connect the outlet port of the gas chamber with the other intake port of the combustion chamber, a compound piston operatable in said air, gas and combustion chambers adapted to force air in said conduit and compress gas in said chamber, and a ported valve sleeve between said air, gas and combustion chambers and said storage chamber and conduit operatable in timed relation to said compound piston and adapted to control the admission and outlet of air and gas to and from all of said chambers.

6. In an engine, the combination of a reciprocable work cylinder having a combustion chamber provided with exhaust ports, said work cylinder having a compression chamber, a storage chamber adapted to connect the compression and combustion chambers of said work cylinder, an intake manifold for the compression chamber of said cylinder, an exhaust manifold for the combustion chamber of said cylinder adapted to have a wall thereof heat the contents of said intake manifold, a piston common to both chambers of said cylinder and adapted to compress gas, a storage chamber, a reciprocable valve sleeve surrounding said work cylinder and adapted to control the admission and outlet of gas to and from the chamber and means connected to said work cylinder and said valve sleeve adapted to reciprocate said work cylinder and said valve sleeve in timed relation to said compound piston.

7. In an explosive engine; the combination with a crank shaft; ported outer cylinders; ported heads in said cylinders providing combustion chambers; ported reciprocable sleeves in said outer cylinders; ported reciprocable work cylinders in said sleeves; partitions in said work cylinders providing gas compression and air chambers; pistons operatable in said gas compression and air chambers; storage chambers connecting ports of said outer cylinders and adapted to conduct gas from said gas compression chambers to the combustion chambers of said heads; conduits connecting ports of said outer cylinders adapted to conduct air from the air chambers of said cylinders to the combustion chambers of said heads; and means actuated by said crank shaft for reciprocating said sleeves, work cylinders and pistons in timed relation so that exhaust ports open, air ports open, gas ports open, air and exhaust ports close and gas ports close in the order named, with the gas ports opening on bottom dead center of said crank shaft.

8. In an engine, a ported cylinder, pistons and heads therein forming a combustion chamber, an air compression chamber and a charge compression chamber, and a single valve mechanism comprising a ported sleeve surrounding the piston, separate therefrom, and movable to coöperate therewith to control admission and exit to and from the several chambers.

9. In an engine, a ported cylinder, pistons and heads therein forming a combustion chamber, an air compression chamber and a charge compression chamber, and a single valve mechanism separate from the pistons and adapted to coöperate therewith to control admission and exit to and from the several chambers, said valve mechanism embodying a movable ported sleeve surrounding the cylinder.

10. In an engine, a ported cylinder, pistons and heads therein forming a combustion chamber, an air compression chamber and a charge compression chamber, a head being located between two pistons and the spaces on opposite sides of that head being the air and charge compression spaces, respectively; and a single valve mechanism separate from the pistons and coöperating therewith to control admission and exit to and from the several chambers.

11. In an internal combustion engine, a ported power cylinder, separated pistons in said cylinder, a head intermediate said pistons, a rod connecting the pistons and passing through the head, and a single valve mechanism including a ported sleeve adapted to coöperate with the pistons and control the admission and exit to and from the chambers between the pistons and the head.

12. In an internal combustion engine, a movable ported cylinder sleeve, separated pistons in said cylinder, a head intermediate said pistons, connecting means between the pistons, and a valve mechanism articulated to coöperate with the pistons and control the admission and exit to and from the chambers between the pistons and the head, said valve mechanism embodying a reciprocating ported sleeve surrounding the ported cylinder and coöperating therewith, and means to move the cylinder sleeve and the last mentioned sleeve in coöperation with movements of the pistons in the cylinder sleeve.

13. In an engine, a ported cylinder sleeve, a head at one end of the cylinder sleeve, a pair of spaced pistons in the cylinder sleeve and a rod connecting them, a head intermediate the spaced pistons, the cylinder sleeve having inlet and exhaust ports for the space adjacent the end head and having an inlet and an outlet port for each of the spaces on opposite sides of the intermediate head, one of said inlet ports adapted to communicate with the atmosphere and the other with a gas supply, conduits making communication between the said outlet ports and the first mentioned inlet port; and a single sleeve valve mechanism surrounding the cylinder sleeve and having ports coöperating with all the cylinder ports.

14. In an engine, the combination of an inner ported cylinder sleeve, an outer ported valve sleeve, an outer ported cylinder, a partition head mounted in and carried by the intermediate portion of the cylinder sleeve, a pair of spaced pistons in the cylinder sleeve on opposite sides of the partition head, and means to cause movement of the two sleeves coöperatively with the piston movements.

15. In an engine, the combination of an inner ported cylinder sleeve, an outer ported valve sleeve, an outer ported cylinder, a partition head mounted in and carried by the intermediate portion of the cylinder sleeve, a pair of spaced pistons in the cylinder sleeve on opposite sides of the partition head, an end head for the cylinder sleeve carried by the outer cylinder, and means to cause movement of the two sleeves coöperatively with the piston movements.

16. In an engine, the combination of an outer cylinder, an inner movable cylinder sleeve, a partition head in an intermediate portion of the cylinder sleeve, separated pistons on opposite sides of said head, means for positively reciprocating the pistons, and means to cause positive movement of the sleeve coöperatively with the piston movements.

17. In an engine, the combination of a plurality of spaced pistons, a cylinder and valve mechanism for the pistons embodying a moving ported cylinder sleeve which forms the working cylinder for all the pistons and a head carried by the cylinder sleeve between the two pistons.

18. In an engine, the combination of an outer cylinder, a plurality of spaced pistons, a cylinder and valve mechanism for the pistons embodying an inner movable cylinder sleeve and an outer movable valve sleeve, both said sleeves having coöperating ports and forming the valve mechanism for the pistons and the inner sleeve forming the working cylinder for the pistons, and a head carried by the cylinder sleeve between two pistons.

19. In an engine, the combination of an outer cylinder, a plurality of spaced pistons, a cylinder and valve mechanism for the pistons embodying an inner movable ported cylinder sleeve which forms the working cylinder for the pistons, and means to move said sleeve coöperatively with the piston movements whereby said moving ported sleeve is a working part of the valve mechanism for the pistons, and a head carried by the cylinder sleeve between two pistons.

20. In an engine, the combination of an outer cylinder, a pair of spaced pistons, an inner movable ported cylinder sleeve forming the working cylinder for both pistons, a valve mechanism coöperating with the pistons and of which said ported cylinder sleeve forms a part, a head at one end of the cylinder sleeve, and a partition head within the cylinder sleeve intermediate the two pistons.

21. In an engine, the combination of an outer cylinder, a pair of spaced pistons, an inner movable ported cylinder sleeve forming the working cylinder for both pistons, a valve mechanism coöperating with the pistons and of which said ported cylinder sleeve forms a part, and also including an outer movable ported valve sleeve, a head at one end of the cylinder sleeve, and a partition head in the cylinder sleeve between the two pistons and mounted on and carried by the cylinder sleeve.

22. In an engine, the combination of an outer ported cylinder, a cylinder sleeve movable therein, a pair of spaced coöperating pistons in said cylinder sleeve which forms the working cylinder for both pistons, a head at one end of the cylinder sleeve forming a combustion chamber above one piston, a partition head in and carried by the cylinder sleeve between the two pistons forming charge compression and air compression spaces between it and the two pistons, said cylinder sleeve having inlet and outlet ports for each of the three said chambers and the outer cylinder having corresponding registering ports, means for effecting coöperative movement between the cylinder sleeve and the pistons, and conduits connecting the outlets of the charge and air compression chambers with the inlet of the combustion chamber.

23. In an engine, the combination of a working cylinder with a head at the upper end, a pair of spaced connected pistons in the cylinder the upper one of which forms with the upper head a combustion chamber, a partition head between the two pistons forming with the upper piston a charge compression chamber and with the lower piston an air compression chamber, each of said chambers having an inlet and an outlet port; and a single valve mechanism positively coöperating with the pistons to open the combustion chamber outlet, open communication between the air compression chamber and the combustion chamber, open communication of the charge compression chamber with the combustion chamber, close the air compression communication and the combustion chamber outlet and close the charge compression communication in the order named.

24. In an engine, the combination of a combustion chamber having intake and exhaust ports, an air compressing chamber having intake and outlet ports and a charge compressing chamber having intake and outlet ports, conduits between the outlets of the compression chambers and the combustion chamber intake arranged in heat absorbing relation to the combustion chamber, and an air intake conduit for the air compressing chamber arranged in heat absorbing relation to the combustion chamber.

25. In an engine, the combination of a combustion chamber having intake and exhaust ports, an air compressing chamber having intake and outlet ports, a charge compressing chamber having intake and outlet ports, conduits between the outlets of the compression chambers and the combustion chamber intake arranged in heat absorbing relation to the combustion chamber, an air intake conduit for the air compressing chamber arranged in heat absorbing relation to the combustion chamber; an exhaust conduit for the combustion chamber, and an intake conduit for the charge compressing chamber in heat absorbing relation to the exhaust conduit.

26. In an engine, the combination in a unitary structure of a combustion chamber, an air compressing chamber for compressing air for scavenging and charging the combustion chamber, and a charge compressing chamber for compressing a combustible charge for the combustion chamber, and conduit means between each of the compressing chambers and the combustion chamber and in direct heat absorbing relation to the walls of the combustion chamber so that the air and charge are heated after compression.

27. In an engine, the combination in a unitary structure of a combustion chamber, an air compressing chamber for compressing air for scavenging and charging the combustion chamber, a charge compressing chamber for compressing a combustible charge for the combustion chamber, and conduit means between each of the compressing chambers and the combustion chamber and in direct heat absorbing relation to the walls of the combustion chamber so that the air and charge are heated after compression, said combustion chamber having a water jacket and said conduit means being within the water jacket.

28. In an engine, the combination of a pair of working mechanisms each including a working cylinder with a head at its upper end, a pair of spaced connected pistons in the cylinder the upper one of which forms with the upper head a combustion chamber, a partition head between the two pistons forming with one of the pistons a charge compression chamber and with the other piston an air compression chamber, each of said chambers having an inlet and an outlet port; means for causing the pistons of the two mechanisms to move oppositely, two conduit means one for compressed air and the other for compressed charge, each of said conduit means being common to both mechanisms to convey the compressed charges and air to the combustion chambers; and valve means for each mechanism coöperating with the pistons thereof to control admission of compressed charge and air to the combustion chamber.

29. In an engine, the combination of a pair of working mechanisms each including a working cylinder with a head at its upper end, a pair of spaced connected pistons in the cylinder the upper one of which forms with the upper head a combustion chamber, a partition head between the two pistons forming with one of the pistons a charge compression chamber and with the other piston an air compression chamber, each of said chambers having an inlet and an outlet port; means for causing the pistons of the two mechanisms to move oppositely, two conduit means one for compressed air and the other for compressed charges, each of said conduit means being common to both mechanisms to convey the compressed charges and air to the combustion chambers; and valve means for each mechanism coöperating with the pistons thereof to control admission of compressed charges and air to the combustion chamber, and exhaust from the combustion chamber, said valve means being so timed with the pistons as to open the exhaust, open communication with the compressed air conduit, open communication with the compressed charge conduit, close the compressed air communication and the exhaust, and close the compressed charge communication in the order named with the compressed charge communication opening near the lowermost point of the piston stroke.

30. In an engine mechanism, the combination of a movable sleeve, a plurality of pistons within the sleeve, a head carried by said sleeve between two of the pistons, means for reciprocating the pistons, and means to move the sleeve in coöperation with movements of the pistons.

31. In an engine mechanism, the combination of a movable sleeve, a plurality of pistons reciprocable directly in the sleeve as a work cylinder, means for reciprocating the pistons in the sleeve, a head carried by said sleeve between two of the pistons, and means to move the sleeve in coöperation with movements of the pistons.

32. In an engine mechanism, the combination of a movable sleeve, a plurality of pistons within and movable relative to the sleeve, means for positively moving the pistons, means to move the sleeve in coöperation with movements of the pistons, and a head within the sleeve intermediate two of the pistons.

33. In an engine mechanism, the combination of a movable ported sleeve, a plurality of pistons within and movable relative to the sleeve, means to move the sleeve in coöperation with movements of the pistons, a head within the sleeve intermediate two of the pistons, and a ported structure surrounding the sleeve with which the sleeve coöperates to perform valve functions.

34. In an engine, the combination of valve and cylinder mechanism embodying inner and outer movable ported coöperating sleeves, a plurality of pistons within the inner sleeve, means for reciprocating the pistons, a head within the inner sleeve between two of the pistons, and means to move the sleeves in coöperation with movements of the pistons.

35. In an engine, the combination of valve and cylinder mechanism embodying an inner ported movable cylinder sleeve and an outer ported movable valve sleeve, the ports of said sleeves adapted to coöperate, a plurality of pistons in the inner cylinder sleeve, a head carried by the inner cylinder sleeve between two pistons, and means to move the two sleeves in coöperation with movements of the pistons.

36. In an engine, the combination of a movable sleeve, a plurality of pistons movable within and relative to the sleeve, a head within the sleeve between two pistons and forming with said pistons two chambers; and a single valve mechanism adapted to control inlet and outlet to and from the two chambers, embodying said sleeve, which has ports communicating with said chambers, and means to move said sleeve in coöperation with movements of said pistons.

37. In an engine mechanism, a movable cylinder sleeve, a pair of pistons reciprocable in the cylinder sleeve, means to reciprocate the pistons, means to move the cylinder sleeve in coöperation with movements of the pistons, a head at one end of the sleeve forming with one of the pistons a chamber, and a head intermediate the pistons within the sleeve forming with each of them a chamber.

38. In an engine mechanism, a movable cylinder sleeve, a pair of pistons reciprocable in the cylinder sleeve, means to reciprocate the pistons, means to move the cylinder sleeve in coöperation with movements of the pistons, a head at one end of the sleeve forming with one of the pistons a chamber, and a head intermediate the pistons within the sleeve forming with each of them a chamber, said intermediate head being carried by and moving with the movable cylinder sleeve.

39. In an engine mechanism, a movable cylinder sleeve, a pair of pistons reciprocable in the cylinder sleeve, means to move the cylinder sleeve in coöperation with movements of the pistons, a head at one end of the sleeve forming with one of the pistons a chamber, and a head intermediate the pistons within the sleeve forming with each of them a chamber, said intermediate head being carried by and moving with the movable cylinder sleeve, a ported structure surrounding the sleeve and the sleeve having ports coöperating therewith; and said first mentioned head being carried by said structure which surrounds the sleeve.

40. In an internal combustion engine, a cylinder structure having a surrounding water jacket, piston and head mechanism in the cylinder forming therewith an explosion chamber and a compression chamber, the cylinder structure embodying ports and a passage for establishing communication between said chambers, said passage being located in the water jacket, and the outer wall of the water jacket being removable to expose said passage.

41. In an internal combustion engine, a cylinder structure having a surrounding water jacket and embodying a plurality of cylinders, piston and head mechanism for each cylinder forming in each cylinder an explosion chamber and a compression chamber, the cylinder structure having ports communicating with the several chambers, a manifold communicating with the several ports and thus connecting the compression chamber with the explosion chamber, said manifold being located within the water jacket, and the outer wall of the water jacket being removable to uncover said manifold.

In testimony whereof I affix my signature in the presence of two witnesses.

JOHN M. CAGE.

Witnesses:
 KARL H. BUTLER,
 ANNA M. DORR.